Patented Mar. 13, 1951

2,545,287

UNITED STATES PATENT OFFICE 2,545,287

TERTIARY DIACYL AMINE INSECTICIDE

James E. Kirby, Wilmington, Del., assignor to E. I. du Pont de Nemours & Company, Wilmington, Del., a corporation of Delaware No Drawing. Application October 10, 1945, Serial No. 621,595

4 Claims. (Cl. 167—24)

This invention relates to pest control and is particularly directed to methods and compositions for preventing or arresting infestations of insects which are economically harmful to man and which commonly infest organic matter whether plant or animal or plant or animal origin either in its natural, fabricated, or synthetic state.

More specifically my invention relates to insecticidal compositions and methods which are characterized by the use of tertiary amines of the type derived from difunctional organic acids and a primary amine and having two valences of nitrogen attached to a diacyl radical, which tertiary amines are referred to herein as tertiary diacyl amines.

This case is a continuation-in-part of my copending application, Serial No. 501,137, filed September 3, 1943, now abandoned.

The invention has as an object the provision of new insecticidal compositions and methods. A further object is to provide new compositions and methods which when employed in connection with other insecticidal agents such as pyrethrum increase the effectiveness of the other insecticidal agents. A still further object is to provide new compositions and methods effective for repelling mosquitoes and other dipterous insects. Other objects will appear hereinafter.

According to the present invention these objects are accomplished by bringing into contact with the insect pest the compositions of the invention, which compositions contain as an essential active ingredient one or more tertiary diacyl amines.

The tertiary diacyl amines employed according to the present invention may be obtained by reacting a suitable difunctional acid with a primary amine under conditions appropriate to ring closures. They are imides of primary amines. They specifically distinguish from secondary diacyl amines, which are the unsubstituted imides, by not having a hydrogen attached to the nitrogen atom. This hydrogen of the secondary diacyl amine is highly activated by reason of its position, alpha, to two strongly negative groups.

The tertiary diacyl amines may be represented by the formula

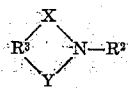

in which —XR³Y— is a diacyl radical and R² is the radical of the primary amine. X and Y are the acyl determinants which may be the same or different and are selected from such radicals as

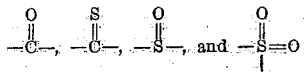

Such cyclic imides may be monocyclic, bicyclic, polycyclic, and carbocyclic or heterocyclic.

In the formula illustrated above R² is the radical of a primary amine, illustrative examples of which include methyl, ethyl, isopropyl, n-propyl, n-isobutyl, n-butyl, n-amyl, mixed amyl, n-heptyl, n-oxtyl, n-dodecyl, cyclohexyl, benzyl, phenyl, ortho-ethoxyphenyl, ortho-xylyl, ortho-tolyl, mixed ortho-, meta-, and para-tolyl, para-dodecylphenyl, ortho-nitrophenyl, meta-nitrophenyl, para-nitrophenyl, ortho-biphenylyl, para-biphenylyl, 2-ethylhexyl, (1,3-phenylene) di-, 2(4-phenylthiazolyl), alpha-naphthyl, 3-chloro-2,4-hexadienyl, methallyl, allyl, beta-hydroxyethyl, beta-cyanoethyl, omega-cyanopentyl, 5,5,5-trichloro-2-pentenyl, and vinyl.

Primary amines such as listed above may be reacted under appropriate conditions with a wide variety of acids, acid anhydrides, or in certain cases acyl halides to give the imides suitable for use in the compositions and methods of the invention. For example, such imides may be prepared from succinic, phenylsuccinic, glutaric, maleic, phthalic, tetra-hydrophthalic, hexahydrophthalic, homophthalic, quinolinic and cinchomeronic, glutaconic, thiodiglycolic, iminodiacetic, diglycolic, N-methyl iminodiacetic, citraconic, dihydrophthalic, 3,6-endomethylene-4-cyclohexene-1,2-dicarboxylic, 3,6-endoethylene-4-cyclohexene-1,2-dicarboxylic, diphenic, aconitic, citric, tricarballylic, and itaconic acids.

The invention may be more fully understood by reference to particular preferred types of tertiary diacyl amines suitable for use in the compositions and methods of this invention, which preferred types are obtainable from the interaction of primary amines and selected acids or their appropriate derivatives. Thus the preferred types of tertiary diacyl amines are those in which R³ of the diacyl group —XR³Y— is an organic radical linking X and Y together by a carbon chain of preferably two but not more than three carbon atoms. Such diacyl groups are characteristic of the following typical acids: succinic, phenylsuccinic, glutaric, maleic, citraconic, mesaconic, pyrocinchonic, ethylmethylmaleic, aconitic, citric, tricarbollylic, itaconic, glutaconic, dithiosuccinic, phthalic, dihydrophthalic, tetra-hydrophthalic (4-cyclohexene-1,2-dicarboxylic), hexahydrophthalic (cyclohexane-1,2-dicarboxylic), homophthalic, quinolinic, cinchomeronic, 3,6 - endomethylene - 4 - cyclohexene-1,2-dicarboxylic, 3,6-endoethylene-4-cyclohexene-1,2-dicarboxylic and 3,6-endomethylene cyclohexane - 1,2 - dicarboxylic, 3,6 - endomethylene - 2 - methyl - 4 - cyclohexene - 1,2 - dicarboxylic, 7 - methyl - 3,6 - endomethylene - 4 - cyclohexene - 1,2 - dicarboxylic, 3 - methyl - 4 - cyclohexene - 1,2 - dicarboxylic, 3 - methyl - 6 - carbobutoxy - 4 - cyclohexene - 1,2 - dicarboxylic and 3,6 - endoethylene - 3 - isopropyl - 6 - methyl-4-cyclohexene-1,2-dicarboxylic.

Other suitable imides include those derived from dithiosuccinic, mono- and di-thiophthalic, orthosulfobenzoic, ortho-sulfophenylacetic, ethane disulfonic, beta-sulfopropionic acids.

The acids having ortho-functional groups are preferred for use in the preparation of the imides suitable for use in the compositions and methods of this invention because they give the 5-membered diacyl amine ring structure.

Succinic, glutaric, maleic and glutaconic acids are typical of the acyclic acids which give monocyclic compounds. From these 5- and 6-membered saturated and unsaturated diacyl amino ring structures are obtainable. Such structures as are obtainable, for example, from acids of the maleic acid and glutaconic series are preferable because of the ethylenic unsaturation in the carbon chain linking the two functional groups. In forming imides from these acyclic acids, it is desirable to use an amine which also is acyclic, and preferably an alkyl amine containing less than 12 carbon atoms.

The phthalic acids, the reduced phthalic acids, the pyridinedicarboxylic acids and the alicyclic dicarboxylic acids listed above are typical of cyclic acids which may be used in producing polycyclic compounds according to the invention. The cyclic acids may be carbocyclic or heterocyclic but preferably are alicyclic ortho-dicarboxylic acids. Non-benzenoid unsaturation in these alicyclic ortho-dicarboxylic acids is desirable and particularly when such unsaturation is gamma, delta to the functional acyl group. The alicyclic group is preferably bicyclic and made up of two fused 5-membered rings as in the case of (2,2,1)-bicyclo-4-heptene-1,2-dioic acid (3,6-endomethylene-4-cyclohexene-1,2-dicarboxylic acid). In producing imides from these cyclic acids it is desirable to use acyclic amines, especially alkyl amines containing less than 8 carbon atoms.

By selecting suitable acids and amines as outlined above there may be obtained a wide variety of compounds suitable for use according to the present invention which in general may be either solids or oils and stable, colorless, relatively odorless, insoluble in water and soluble in most organic solvents such as acetone, alcohol, ether, benzene, kerosene and certain other hydrocarbon solvents. In general, such compounds may be prepared as described above and more particularly illustrated below by the interaction of the appropriate acid ester or anhydride with the desired amine either alone or in the presence of solvents such as benzene or other indifferent solvents.

SCHEME 1

*Preparation of the N-(n-butyl) imide of 3,6-endomethylene-4-cyclohexene-1,2-dicarboxylic acid*

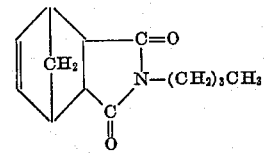

The anhydride of the above acid is first prepared by bubbling 66 g. of freshly distilled cyclopentadiene monomer (B. P. 41° C.) below the surface of a mixture of 98 g. of maleic anhydride and 200 cc. of benzene at ordinary room temperature and injecting the cyclopentadiene as rapidly as is consistent with adequate reflux to prevent loss of reactants. This operation is complete in 15–20 minutes.

Seventy-three grams of dry n-butylamine is then added as rapidly as reflux capacity will permit. Water is removed from this mixture in an apparatus for refluxing and distilling, separating the water and returning the benzene to the reaction pot. After removal of 16.5 cc. of water by this procedure, the benzene is distilled from the product leaving a residue with an acid number of 9.5. This crude acidic material, amounting to 214 g., is purified by direct distillation or by first alkaline scrubbing and then distillation. A satisfactory product for insecticidal use is obtained by scrubbing the crude acidic material with a slight excess of the theoretical amount of 5% sodium hydroxide solution, which results in a loss of approximately 6–8% in the weight of the product. This substantially neutral product is on further purification by distillation from a modified Claisen flask found to possess a boiling point of 134–137° C./2 mm., giving 186 g. of a colorless oil which soon solidifies to a white solid, melting at 42–44° C. ($n_D^{40°C.}=1.5030$).

Alternately, the intermediate anhydride of the above 3,6-endomethylene - 4 - cyclohexene - 1,2-dicarboxylic acid may be prepared by heating under reflux a mixture of 66 grams of dicyclopentadiene and 98 grams of maleic anhydride at 170° C. for 4–5 hours.

Other analogues are produced by substituting for n-butylamine such amines as methyl, ethyl, propyl, isopropyl, isobutyl, n-amyl, mixed amyl, n-heptyl, n-octyl, n-dodecyl, cyclohexyl, benzyl, phenyl (aniline), ortho-ethoxyphenyl, orthoxylyl, beta-hydroxyethyl, beta-cyanoethyl, allyl and omega-cyanopentyl amines. Similarly other analogues are produced by substituting for the cyclopentadiene other dienes which react with maleic acid to give alicyclic ortho-dicarboxylic acids such as 3,6-endomethylene-cyclohexane-1,2 - dicarboxylic acid, 3,6 - endomethylene - 2-methyl - 4 - cyclohexene - 1,2 - dicarboxylic acid, 7-methyl-3,6- endomethylene-4-cyclohexene-1,2-dicarboxylic acid, 4-cyclohexene-1,2-dicarboxylic acid, 3-methyl - 4 - cyclohexene-1,2-dicarboxylic acid, 3-methyl-6-carbobutoxy-4-cyclohexene-1,2-dicarboxylic acid, cyclohexane-1,2-dicarboxylic acid, and 3,6-endomethylene-3-isopropyl-6-methyl-4-cyclohexene-1,2-dicarboxylic acid.

The following are typical of such analogues.

TABLE I

*Imides of 3,6-endomethylene-4-cyclohexene-1,2-dicarboxylic acid*

N-methyl, M. P. 105–107° C., Found N, 7.74%
N-ethyl, M. P. 77–79° C., Found N, 7.26%
N-isopropyl, M. P. 89–90° C., Found N, 6.71%
N-n-propyl, B. P. 133° C./2 mm.
N-n-isobutyl, M. P. 88–89° C., Found N, 6.30%
N-n-butyl, M. P. 42–44° C., Found N, 6.32%
N-n-amyl, B. P. 145–153° C./2 mm., Found N, 5.98%
N-mixed amyl,[1] B. P. 144–148° C./3 mm., Found N, 5.55%
N-n-heptyl, B. P. 168° C./2 mm., Found N, 5.25%
N-n-octyl, B. P. 181–185° C./2 mm., Found N, 5.45%
N-n-dodecyl, viscous oil, Found N, 4.65%
N-cyclohexyl, M. P. 157–158° C., Found N, 6.10%
N-benzyl, M. P. 60–62° C., Found N, 6.16%
N-phenyl, M. P. 135–136° C., Found N, 5.51%
N-o-ethoxyphenyl, M. P. 114–115° C., Found N, 4.78%
N-o-xylyl, M. P. 157–158° C., Found N, 4.75%
N-beta-hydroxyethyl, B. P. 173–180° C./3 mm., Found N, 6.86%
N-beta-cyanoethyl, M. P. 113–115° C., Found N, 13.51%
N-allyl, B. P. 125–127° C./2 mm., Found N, 6.81%
N-omega-cyanopentyl, M. P. 54–58° C.
N-n-amyl 3,6-endomethylene-cyclohexane-1,2-dicarboxylic imide, B. P. 135–141° C./3 mm.
N-n-butyl, 3,6-endomethylene-2-methyl-4-cyclohexene-1,2-dicarboxylic imide, B. P. 124–128° C./2 mm., Found N, 5.69%
N-n-butyl-7-methyl-3,6-endomethylene-4-cyclohexene-1,2-dicarboxylic imide, B. P. 152–155° C./5 mm., Found N, 5.86%
N-n-butyl-4-cyclohexene-1,2-dicarboxylic imide, B. P. 121–122° C./2 mm., Found N, 6.68%
N-n-butyl-3-methyl-4-cyclohexene-1,2-dicarboxylic imide, B. P. 122–129° C./2 mm., Found N, 6.26%
N-methyl-3-methyl-6-carbobutoxy-4-cyclohexene-1,2-dicarboxylic imide, M. P. 78–79° C., Found N, 5.02%
N-n-butyl-cyclohexane-1,2-dicarboxylic imide, B. P. 134–135° C./2 mm., Found N, 6.77%

*Imides of 3,6-endoethylene-3-isopropyl-6-methyl-4-cyclohexene-1,2-dicarboxylic acid*

N-methyl, Found N, 3.87%
N-allyl, Found N, 4.62%
N-n-butyl, Found N, 4.61%
N-cyclohexyl, Found N, 4.24%
N-n-dodecyl, Found N, 3.34%
N-phenyl, Found N, 3.90%

[1] A proprietary product consisting of a mixture of various isomers as tert.-amyl, sec.-amyl, isoamyl, n-amyl, active-amyl amines and 2- and 3-amino pentane.

SCHEME 2

*Preparation of N-phenylmaleimide*

N-phenylmaleamic acid was prepared by stirring 186.2 grams of aniline into a solution of 198.2 grams of maleic anhydride in 1500 cc. of chloroform at 15 to 20° C. Stirring was continued for 20 minutes and a pale yellow powder melting at 209–210° C. was recovered by filtration, washing and drying. A mixture of 57.4 g. (0.3 mole) of n-phenylmaleamic acid (maleanilic acid), 10 g. (0.12 mole) of fused sodium acetate, and 102.1 g. (1 mole) of acetic anhydride was heated with stirring on a steam bath. When the temperature of the mixture had reached 80° C. all of the N-phenymaleamic acid had gone into solution and the bath was dropped. The temperature continued to rise to a maximum of 92° C. from the heat of the reaction. The reaction mixture was allowed to cool to room temperature (one hour) and then poured slowly into a stirred ice-water slurry (800 cc.). The yellow crystalline precipitate was filtered off, washed well with water, and dried in vacuo over $P_2O_5$. The yield was 44 g. (85%) of yellow crystalline powder melting at 90–1° C.

Other analogues are produced by substituting for the aniline such amines as n-dodecyl, p-ethoxyphenyl, alpha-naphthyl, o-tolyl, m-tolyl, p-tolyl, mixed o-, m-, and p-tolyl, p-dodecylphenyl, o-nitrophenyl, m-nitrophenyl, p-nitrophenyl, o-biphenylyl, p-biphenylyl, 2-ethylhexyl amines and (1,3-phenylene) diamine. Similarly other analogues are produced by substituting for maleic anhydride various other acids of the maleic acid series or their anhydrides such as citraconic, mesaconic, pyrocinchonic (dimethylmaleic), ethylmethylmaleic, aconitic, etc.

The following are typical of such analogues.

TABLE II

N-phenylmaleimide, M. P. 90–91° C.
N-n-dodecylmaleimide, M. P. 56–57° C., Found N, 5.70%
N-p-ethoxyphenylmaleimide, M. P. 75–76° C., Found N, 5.33%
N-alpha-naphthylmaleimide, M. P. 116–117° C.
N-o-tolylmaleimide, M. P. 70–71° C., Found N, 7.54%
N-m-tolylmaleimide, B. P. 142–145° C./2 mm., Found N, 7.68%
N-p-tolylmaleimide, M. P. 149–150° C., Found N, 7.55%
Mixture of N-o-, N-m-, N-p-tolylmaleimides
N-p-dodecylphenylmaleimide, M. P. 67–68° C., Found N, 4.27%
N-o-nitrophenylmaleimide, M. P. 130–131° C., Found N, 12.96%
N-m-nitrophenylmaleimide, M. P. 126–127° C., Found N, 12.77%
N-p-nitrophenylmaleimide, M. P. 167–168° C., Found N, 13.09%
N-o-biphenylmaleimide, M. P. 139–140° C., Found N, 5.57%
N-p-biphenylmaleimide, M. P. 139–149° C., Found N, 5.76%
N-2-ethylhexylmaleimide, B. P. 128–131° C./8 mm., Found N, 6.47%
N,N'-(1,3-phenylene)-dimaleimide, M. P. 198–199° C., Found N, 10.17%

TABLE III

N-n-butylmaleimide, B. P. 81–84° C./3 mm.
N-vinylsuccinimide, M. P. 48.5° C.
N-n-octylsuccinimide, B. P. 139–142° C./2 mm., Found N, 6.99%
N-n-dodecylsuccinimide, M. P. 54–55° C., Found N, 5.11%
N-n-benzylsuccinimide, M. P. 103.5–105° C., Found N, 7.46%
N-2(4-phenylthiazolyl)-succinimide, M. P. 163–164° C., Found S, 12.13%
N-(2-biphenylyl) succinimide, M. P. 127–128° C., Found N, 4.92%
N-n-amylsuccinimide, B. P. 112–113° C./4 mm., Found N, 8.83%
N-phenyl-alpha-chloro-succinimide, M. P. 116–117° C.
N-vinylphthalimide, M. P. 82.6° C.
N-n-dodecylphthalimide, M. P. 64–65° C., Found N, 3.98%
N-cyclohexylphthalimide, M. P. 167–168° C., Found N, 6.78%
N-methallylphthalimide, M. P. 79–80° C., Found N, 7.36%
N-alpha-naphthylphthalimide, M. P. 179–181° C.
N-o-ethoxyphenylphthalimide, M. P. 123–124° C., Found N, 5.33%
N-3-chloro-2,4-hexadienylphthalimide, M. P. 119–120° C., Found N, 5.34%
N-mixed amylhomophthalimide, B. P. 163–168° C./3 mm., Found N, 5.41%
N-ethylsaccharin, M. P. 94–95° C.
N-allylsaccharin, M. P. 93–94° C., Found S, 14.11%
N-n-amylsaccharin
N-n-dodecylsaccharin, M. P. 50–51° C., Found N, 9.07%
N-benzylsaccharin, M. P. 109–110° C.
N-5,5,5-trichloro-2-pentenylsaccharin, M. P. 109–110° C., Found Cl, 29.97%
N-carbohexoxymethylsaccharin, M. P. 55–56° C., Found S, 9.63%
[3-(n-amyl)] 5-methyl-5-isobutyl hydantoin, B. P. 157–162° C./3 mm., Found N, 11.47%

I am aware that various imides have been suggested as insecticides, fungicides, or bactericides, but I am not aware that the tertiary diacyl amines employed in the compositions and methods of this invention have ever been considered to be, or thought to be, or suggested to be of value for the control of insect pests. Thus in U. S. Patent 2,205,558 imides of maleic acid are suggested as bactericides and fungicides. Bactericides and fungicides, however, are a different field from that of the present invention and compounds as a rule useful in one are not useful in the other. In U. S. Patent 2,119,701 mercuriated imides are suggested as disinfectants and fungicides. These compounds, however, are salts of secondary diacyl amines. In U. S. Patent 1,961,840, 2,4-diketo-tetrahydrothiazole is disclosed to have insecticidal properties. Also, in British Patent 407,356, there are disclosed certain mixed carboxylic and sulfonic acid imides as ingredients of mothproofing compositions. In those of the above compounds disclosed as insect toxicants, the N-hydrogen is alpha to two strongly negative carbonyl groups and as such has salt-forming properties possibly by reason of the fact that the hydrogen wanders, yielding a tautometric enol form.

In U. S. Dept. of Agriculture Circular No. 523 on the "Toxicity of Certain Organic Insecticides to Codling Moth Larvae in Laboratory Tests" there is reported inconclusive tests of phthalimide as codling moth control. In the Journal of Industrial and Engineering Chemistry 19, 1175 (1927), potassium phthalimide is reported ineffective for mothproofing. In the Journal of Economic Entomology 33, 669 (1940), nitro and bromo phthalimides are reported ineffective against screw-worms and in U. S. Dept. of Agriculture Bulletin No. 1160 "Studies on Contact Insecticides" succinimide is reported ineffective against *Aphis rumicis*. The imides of these publications, unlike the imides of the invention, are characterized by a highly reactive N-hydrogen. Moreover, the teachings of these publications are essentially negative.

The compositions of the invention are particularly useful as fly sprays preferably as solutions of tertiary diacyl amines in a refined kerosene fly spray base, as mosquito repellents, delousing agents, for the control of bed bugs, and for the control of similar pests.

Heretofore the control of such pests as flies, for example, particularly in the household, has been effected almost exclusively by pyrethrum fly sprays. For the past several years efforts have been made to introduce organic thiocyanates into this field but without much success until the current emergency restricted supplies of pyrethrum. These thiocyanate sprays, however, while effective, do not have the desirable characteristics of pyrethrum sprays and are tolerable in household sprays only under the conditions of the war emergency.

Even so, there are applications which require pyrethrum in which the organic thiocyanates are undesirable. Thus pyrethrum activated by a synergist, sesame oil, is required in the new aerosol sprays and pyrethrum activated by a synergist, N-isobutylundecylenamide, is required in delousing. Materials therefore which will step up efficiency of the pyrethrum insecticides or replace part of the pyrethrum are much needed to conserve our limited supply of pyrethrum.

The tertiary diacyl amines are such materials. They increase the efficiency of pyrethrum insecticides in varying degrees according to the particular imide employed and in the same measure permit reduction in pyrethrum content. Some of the more effective materials, such as the n-butyl and n-amyl imides of 3,6-endomethylene-4-cyclohexene-1,2-dicarboxylic acid, are substantially more effective in being able to displace pyrethrum in fly sprays than such known synergists as N-isobutylundecylenamide.

Pyrethrum fly sprays contain a minimum of 100 mgs. pyrethrins per 100 cc. of fly spray base oil such as a refined kerosene. Such is the composition of the official test insecticide used as a standard of comparison in the industry. According to this invention it is possible to replace as much as 90% or more of the pyrethrins with a suitable imide and still obtain the same paralytic and lethal effects, and to replace as much as 95% or more of the pyrethrins and still obtain the same lethal effect without excessive reduction of paralytic effect. Preferred compositions according to the invention accordingly may contain from about 5 to about 100 mgs. pyrethrins together with considerable quantity of the imide dissolved in a fly spray base.

In such compositions, using the more active imides according to the invention, results comparable to the official test insecticide may be obtained by replacing pyrethrum by imides in the ratio of approximately 10 parts of imide for each part of pyrethrum replaced. The compositions of the invention accordingly may contain as a bare minimum from about 5 to about 100 mgs. pyrethrum per 100 cc. fly spray and at least from about 10 (100−P) mgs. imide per 100 cc. fly spray, where P equals mgs. of pyrethrum per 100 cc. fly spray with maximum of imide limited only by the solubility of the imide in the fly spray base.

It is frequently the practice in the art to manufacture a composition containing the active ingredients of the formulation in larger amounts than would normally be utilized in a fly spray, such composition being called a "concentrate." Such compositions, or concentrates, are so formulated that by a proper and usually predetermined degree of dilution of the concentrates of class AA, class A, or class B insecticide may be produced as desired.

When it is desired to produce as a concentrate a composition of this invention containing pyrethrum and an imide, the amount of pyrethrum and the preferred minimum amount of imide required would be $(X+1)P$ mgs. per 100 cc. of concentrate and $10(X+1)(100-P)$ mgs. per 100 cc. concentrate, respectively, where X is the volume of diluent to be used per unit volume of concentrate in the subsequent dilution to yield the desired fly spray, and P is the amount of pyrethrum desired in the fly spray and should be from about 5 to about 100 mgs. per 100 cc. of fly spray.

Thus it will be seen from the above that the weight ratio of pyrethrum to imide in the preferred compositions of the invention is expressed by the fraction $P/10(100-P)$. Since the minimum amount of pyrethrum required is 5 mgs. per 100 cc. of spray, the weight ratio of pyrethrum to imide of at least 1/190 should be present in the preferred compositions of this invention.

The following tables illustrate the results obtained with a typical composition of the invention using some of the more effective imides.

FLY SPRAY TESTS ON REPRESENTATIVE CLASSES OF IMIDES

TABLE IV

*Imides of 3,6-endomethylene-4-cyclohexene-1,2-dicarboxylic acid*

|  | Compound at 2% in fly spray base, Amount of Pyrethrum | | | Controls, Pyrethrum | | | |
|---|---|---|---|---|---|---|---|
|  | None | 30 mg. | 40 mg. | None | 30 mg. | 40 mg. | 100 mg. |
| N-methyl | 83-28 | 96-91 |  | 10-0 | 88-6 |  |  |
| N-ethyl | 77-35 | 95-88 |  | 10-0 | 88-6 |  |  |
| N-isopropyl | 58-34 | 94-88 |  | 10-0 | 88-6 |  |  |
| N-n-propyl | 73-52 | 96-93 |  | 10-0 | 88-6 |  |  |
| N-isobutyl | 61-14 | 98-80 |  | 3-0 | 81-2 |  |  |
| N-n-butyl | 85-34 | 95-91 |  | 3-0 | 81-2 |  |  |
| N-n-amyl | 85-45 | 98-72 |  | 3-0 | 81-2 |  |  |
| N-mixed amyl |  |  | 93-87 |  |  |  | 98-45 |
| N-heptyl | 60-13 | 95-60 |  | 10-0 | 88-6 |  |  |
| N-octyl |  |  | 95-58 |  |  | 82-6 | 98-30 |
| N-n-dodecyl | 18-0 | 93-45 |  | 5-0 | 81-2 |  |  |
| N-cyclohexyl | 26-1 | 96-25 |  | 3-0 | 81-2 |  |  |
| N-benzyl** |  |  | 97-87 |  |  | 82-6 | 98-30 |
| N-phenyl** |  |  | 97-87 |  |  | 82-6 | 98-30 |
| N-ethoxy phenyl |  |  | 94-60 |  |  |  | 98-43 |
| N-o-xylidyl |  |  | 97-20 |  |  |  | 98-43 |
| N-beta-cyanoethyl | 30-2 | 92-58 |  | 10-0 | 88-6 |  |  |
| N-allyl | 65-47 | 95-93 |  | 11-0 | 83-3 |  |  |
| N-omega-cyanoamyl | 33-1 | 78-31 |  | 11-0 | 83-3 |  |  |

TABLE V
Miscellaneous cycloaliphatic imides

| | Compound at 2% in fly spray base, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| N-n-butyl-3,6-endomethylene-2-methyl-4-cyclohexene-1,2-dicarboxylic imide | 89-58 | 98-95 | | | 79-5 | | |
| N-n-butyl-7-methyl-3,6-endomethylene-4-cyclohexene-1,2-dicarboxylic imide | 85-39 | 99-95 | | | 79-5 | | |
| N-n-butyl-4-cyclohexene-1,2-dicarboxylic imide | 83-4 | 98-37 | | | 79-5 | | |
| N-n-butyl-3-methyl-4-cyclohexene-1,2-dicarboxylic imide | 78-7 | 99-38 | | | 79-5 | | |
| N-n-butyl-cyclohexane-1,2-dicarboxylic imide | 75-3 | 98-20 | 93-39 | | 79-5 | | |
| N-n-amyl-3,6-endomethylene-cyclohexane-1,2-dicarboxylic imide | | | 97-67 | | | | 98-45 |
| N-methyl-3-methyl-6-carbobutoxy-4-cyclohexene-1,2-dicarboxylic imide | | | 96-36 | | | | 98-45 |
| N-n-butyl-3,6-endoethylene-3-isopropyl-6-methyl-4-cyclohexene-1,2-dicarboxylic imide** | | | 93-39 | | | | 98-45 |

TABLE VI
Imides of maleic acid

| | Compound at 2% in fly spray base, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| N-n-butyl | | 95-61 | 96-40 | | | | |
| N-2-ethyl-hexyl | 90-53 | 98-91 | | 0-0 | 94-22 | | |
| N-p-ethoxy-phenyl | 47-12 | 93-59 | | 13-0 | 87-9 | | |
| N-phenyl** | 72-29 | 97-46 | | 3-0 | 81-2 | | |
| N-alpha-naphthyl | 13-0 | 95-37 | | 13-0 | 87-9 | | |
| N-o-tolyl | 71-55 | 98-91 | | 8-1 | 99-10 | | |
| N-m-tolyl* | 74-57 | 99-90 | | 8-1 | 99-10 | | |
| N-p-tolyl | 6-1 | 94-48 | | 8-1 | 99-10 | | |
| N-mixed o-, m-, and p-tolyl | | | | 8-1 | 99-10 | | |
| N-p-n-dodecyl phenyl | 1-0 | 93-14 | | 0-0 | 94-22 | | |
| N-o-nitro-phenyl | 0-0 | 98-42 | | 0-0 | 94-22 | | |
| N-m-nitro-phenyl | 1-0 | 94-38 | | 0-0 | 94-22 | | |
| N-o-biphenyl | 2-0 | 94-46 | | 0-0 | 94-22 | | |
| N-vinyl phthalimide | 34-2 | 98-14 | | 3-0 | 81-2 | | |
| N-methallyl phthalimide*** | | | 95-43 | | | 82-6 | 98-30 |
| N-cyclohexyl phthalimide | 13-0 | 98-21 | | | | | 98-38 |
| N-o-ethoxy-phenyl-phthalimide | | | 90-25 | | | | 98-38 |

TABLE VII
Miscellaneous imides

| | Compound at 2% in fly spray base, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| N-n-vinyl succinimide | | 96-13 | | | 96-17 | | |
| N-n-amyl succinimide | | | 97-25 | | | | 98-44 |
| N-n-octyl succinimide | 95-13 | | | 2-0 | 81-2 | | |
| N-n-dodecyl | | | 94-28 | | | | 98-44 |
| N-phenyl-alpha chloro succinimide | 24-0 | 94-30 | | 13-0 | 87-9 | | |

TABLE VIII

| | Compound at 2% in fly spray base, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| N-ethyl saccharin | | | 90-48 | | | 80-6 | 98-31 |
| N-allyl saccharin** | | | 94-86 | | | 80-6 | 98-31 |
| N-n-amyl saccharin** | | | 96-53 | | | 80-6 | 98-31 |
| N-benzyl saccharin | | | 92-24 | | | 80-6 | 98-31 |
| Mixed N-amyl-homophthalimide | 26-0 | 98-38 | | | 93-6 | | |

NOTE: The first figure in the above columns represents paralysis after 10 minutes, and the figure after the hyphen represents the percent killed after 24 hours according to the Standard Peet-Grady method of evaluation.

The 100 milligram pyrethrum control is the official test insecticide. In the other instances the carrier or fly spray base is a proprietary refined kerosene (Deobase).

The data in the first column (without pyrethrum) were taken in a modification of the Peet-Grady test differing principally in the volume of spray (15 cc.) and time of exposure (15 minutes) as well as the classification of paralyzed flies.

A number of the above imides were insoluble at 2% in Deobase-kerosene and required the assistance of a blending solvent to complete solution. Ten percent dioxane was used in connection with the compounds marked with (*) in order to formulate a satisfactory 2% solution. Approximately 20% dioxane was used in connection with those compounds marked with () and approximately 30% dioxane with those marked (*).

The data given in the following table are illustrative of compositions containing various mixtures of n-butyl imide of 3,6-endomethylene-4-cyclohexene-1,2-dicarboxylic acid with pyrethrum in a fly spray base hydrocarbon solvent. These compositions are comparable in efficiency to the standard 100 mg. fly sprays (class B), or the equivalent, which are available on the open market. The data illustrate the marked synergism of the imide pyrethrum mixtures. If only the additive effects were involved the composition curve would be a linear one, ranging from the 2000 mgs. or more of the imide required to equal the kill of the 100 mg. pyrethrum spray to the 100 mgs. of pyrethrum. Hence the theoretical composition may easily be calculated, for example, if the mixture contains only 40% of the pyrethrum (40 mg./100 cc.) necessary to give the standard class B fly spray it should contain 60% of the imide required to equal the kill of 100 mg. pyrethrum/100 cc. fly spray, or 1200 mg./100 cc. It will be observed from the data given in the table that actually less than one half of that amount of imide is required. This is indicative of a very marked synergism.

TABLE IX

| Actual Composition, Mg./100 cc. | | Calculated Theoretical Composition | | Percentage Control | Percentage Kill Over and Above Standards | |
|---|---|---|---|---|---|---|
| Imide | Pyrethrum | Imide | Pyrethrum | | OTI | PTI |
| 0 | 100 | ------ | ---- | ¹ 98–28 | 0 | +9 |
| 0 | 100 | ------ | ---- | 98–35 | 0 | 0 |
| 0 | 100 | ------ | ---- | 98–41 | 0 | 0 |
| 0 | 100 | ------ | ---- | 98–44 | 0 | –4 |
| 0 | 100 | ------ | ---- | 98–37 | 0 | 0 |
| 0 | 100 | ------ | ---- | ¹ 98–26 | 0 | +8 |
| 420 | 40 | { 420<br>1,200 | 79<br>40 | } 98–30 | ¹ +4 | –4 |
| 550 | 40 | { 550<br>1,200 | 72<br>40 | } 97–35 | +7 | –2 |
| 780 | 28 | { 780<br>1,440 | 61<br>28 | } 97–34 | +6 | –3 |
| 1,000 | 20 | { 1,000<br>1,600 | 50<br>20 | } 97–43 | +5 | +5 |
| 1,000 | 15 | { 1,000<br>1,700 | 50<br>15 | 97–46<br>96–41 | +5<br>¹ +13 | +5<br>+4 |
| 1,250 | 4 | { 1,750<br>1,920 | 37<br>4 | } 93–48 | 0 | –2 |
| 2,000 | 0 | ------ | ---- | 83–34 | 0 | 0 |
| 2,000 | 0 | ------ | ---- | 63–36 | 0 | –3 |

OTI=Official test insecticide (100 mgs. pyrethrum).
PTI=Proprietary test insecticide (pyrethrum activated with N-isobutylamide of undecylenic acid).
¹ Kill for OTI unusually low.

While the compositions and methods of this invention are particularly useful for the control of flies, as mosquito repellents, and for combatting like pests subject to control by household sprays, the invention is not so limited because many of the imides show toxicity, though in a lesser degree, to other insects such as red spider, aphids, clothes moths and Mexican bean beetles. For example, when applied in the form of a 1% talc dust to bean plants infested with Mexican bean beetle larvae N-allyl-3,6-endomethylene-3-isopropyl-6-methyl-4-cyclohexene-1,2-dicarboxylic imide gave 83% kill with only 2% defoliation; methallyl phthalimide gave 93% kill and 5% defoliation; N-n-butyl-3,6-endomethylene-2-methyl-4-cyclohexene-1,2-dicarboxylic imide gave 100% kill and 0% defoliation; N-isobutyl-3,6-endomethylene-4-cyclohexene-1,2-dicarboxylic imide gave 87% kill and 0% defoliation; N-n-butyl-3,6-endomethylene-4-cyclohexene-1,2-dicarboxylic imide gave 100% kill and 0% defoliation; N-phenyl maleimide gave 90% kill and 1% defoliation; N-n-amyl-3,6-endomethylene-4-cylohexene-1,2-dicarboxylic imide gave 83% kill and 0% defoliation and was equally effective at one half concentration; N-benzyl-3,6-endomethylene-4-cyclohexene-1,2-dicarboxylic imide gave 100% kill and 0% defoliation and gave equal results at one half the concentration; N-ethyl saccharin gave 100% kill and 5% defoliation and equal results at one half the concentration; N-allyl saccharin gave 100% kill and 0% defoliation and substantially the same results at one half the concentration; N-n-butyl-7-methyl-3,6-endomethylene-4-cyclohexene-1,2-dicarboxylic imide gave 100% kill and 0% defoliation; N-n-butyl-hexahydrophthalimide gave 97% kill and 0% defoliation; and N-o-tolyl maleimide gave 83% kill and 0% defoliation.

It will be understood that the tertiary diacyl amines suitable for use in the compositions of the invention may be incorporated with various adjuvants, toxicants, and other ancillary agents, but whether the control of particular pests involved be realized as a result of ingestion, contact, or repellent action, the prime requisite is that the active ingredient be in a suitable form of dispersion to make possible effective contact of the pest with the active agent or its vapors as the case may demand.

Those conversant with the pest control art know the particular adjuvants, toxicants, and ancillary agents which may be combined with a suitable toxicant or combination of toxicants to yield a composition suited to the control of a particular insect, having in mind the nature of the insect, its particular habitat and feeding habits and its peculiar susceptibilities, if any. I have found that insecticidal adjuvants can be combined similarly in various formulations with tertiary diacyl amines to yield new and effective insecticidal compositions.

By the term "insecticidal adjuvant" I mean a substance which is capable of presenting or aiding in the presentation of an insecticidal material to an insect. The term "adjuvant" is well established in the art where it is recognized that an insecticidal agent or toxicant is in itself of little practical utility for combatting insects unless it be presented in a form suitable for effecting intimate contact of the agent or its vapors, as the particular case may require, with the insect. Thus additional material or materials are employed in the formulation of an active ingredient to yield a suitable pest control composition, such materials being adjuvants. It will be appreciated, however, that materials which would be toxic to warm blooded animals, would effect plant injury, or have other undesirable qualities at the concentrations and under the conditions to be employed are generally unsuitable as adjuvants.

Preferably the tertiary diacyl amines may be utilized in the form of solutions in a suitable solvent, dust compositions, or slurries or emulsions in water according to the requirements of control of the particular insect involved.

In the case of solutions of the active agent in a solvent, the adjuvant may be a hydrocarbon and is preferably a refined kerosene. The adjuvant employed when a dust composition is desirable may be selected from the class of finely divided solids comprising talcs, pyrophyllite, natural clays, and diatomaceous earth, such materials having a frequency particle size less than 50 microns. When it is desirable to use the insecticidal composition as a slurry dispersed in water then the composition is produced preferably in the form of a powder containing one of the adjuvants common to the dust compositions described above, said powder then being dispersed for actual usage in water, usually with the aid of a wetting agent or dispersing agent.

If the insecticidal composition is liquid to be used in the form of a dispersion or an emulsion in water, then it is preferred to prepare a relatively concentrated composition of the active agent in a suitable solvent selected according to the compound to be used and the use to which it is to be put, or to prepare an emulsion of the active agent in a non-solvent liquid in certain cases where such technique is more applicable, said solution or emulsion subsequently being dispersed in water to permit suitable application. In the cases of compositions prepared for ultimate use as emulsions in water, the essential adjuvant is a wetting, dispersing, or emulsifying agent such as the alkali metal or amine salts of oleic acid and the sulfated higher alcohols, the sulfonated animal and vegetable oils such as sulfonated fish or castor oils, the sulfonated petroleum oils, and the like.

The compositions of the invention may include as an essential active ingredient one or more of the tertiary diacyl amines in various combinations with such adjuvants as spreaders, stickers, diluents or extenders, and with other toxicants as may be most suited to the control of a particular pest or group of pests; for example, insecticides such as metallic arsenates, fluosilicates, phenothiazines, 2,2-bis(para - chlorophenyl)-1,1,1-trichloroethane and 2,2-bis(para-methoxyphenyl)-1,1,1-trichloroethane, organic thiocyanates such as n - dodecyl thiocyanate, fenchyl thiocyanoacetate and butyl Carbitol thiocyanate, nicotine, anabasine (neo-nicotine), nor-nicotine, rotenone and its congeners, hellebore, pyrethrum, N-isobutyludecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and derivatives of dithiocarbamic acid such as ferric dimethyldithiocarbamate.

The compositions of the invention may also include tertiary diacyl amines with adjuvants such as calcium phosphate, sulphur, lime, flours such as walnut shell, wheat, redwood, soya bean, cottonseed, or with organic solvents such as trichloroethylene, tetrachlorethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue may be used. Such mixtures with insecticides and fungicides and insecticidal and fungicidal adjuvants as are here set out may have particular usefulness in special applications and frequently will give better results than would be anticipated from the killing power or repellent action of each ingredient when used alone.

Broadly, suitable compositions may be prepared with the tertiary diacyl amines in a state of composition, sub-division, and association with other materials such as have been mentioned, such as may be necessary peculiarly to adapt the tertiary diacyl amines to the purpose to be effected. It is more specifically desired, however, to employ the tertiary diacyl amines in admixture in compositions containing insecticidal adjuvants selected from the group consisting of a hydrocarbon solvent, a talc having a frequency particle size less than 50 microns, and a sulfated higher alcohol.

The term "insecticidal composition" used herein has the same meaning as the term "insecticide" as defined in section 6 of the Insecticide Act of 1910. Thus the term "insecticidal composition" refers to any substance or mixture of substances intended to be used for preventing, destroying, repelling, or mitigating any insects which may infest vegetation, man or other animals, or households, or be present in any environment whatsoever.

I use the term "insect" herein in the same sense as defined in the Insecticide Act of 1910, section 6, wherein it includes the small invertebrate animals belonging to the class Insecta, as well as other allied classes of arthropods whose members are wingless and usually have more than six legs, as spiders, mites, ticks, and centipedes.

I claim:

1. An insecticidal composition containing as an essential active ingredient in solution in kerosene, a tertiary diacyl amine represented by the formula

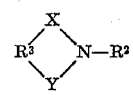

in which —XR³Y— is a diacyl radical and R² is a monovalent organic radical linked to the nitrogen atom thru a carbon atom.

2. An insecticidal composition containing as an essential active ingredient in solution in kerosene, a tertiary diacyl amine represented by the formula

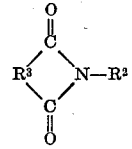

in which R³ is o-benzo and R² is a monovalent organic radical linked to the nitrogen atom thru a carbon atom.

3. A fly spray composition comprising a solution of pyrethrum and a tertiary diacyl amine represented by the formula

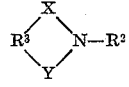

in which —XR³Y— is a diacyl radical and R² is a monovalent organic radical linked to the nitrogen atom thru a carbon atom, the weight ratio of said pyrethrum to said tertiary diacyl amine in said composition being at least 1/190.

4. A fly spray composition comprising a solution of pyrethrum and a tertiary diacyl amine represented by the formula

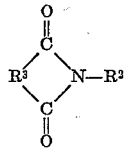

in which R³ is o-benzo and R² is a monovalent organic radical linked to the nitrogen atom thru a carbon atom, the weight ratio of said pyrethrum to said tertiary diacyl amine in said composition being at least 1/190.

JAMES E. KIRBY.

REFERENCES CITED

The following references are of record in the file of this patent:

UNITED STATES PATENTS

| Number | Name | Date |
|---|---|---|
| 1,961,840 | Bolton | June 5, 1934 |
| 2,119,701 | Callsen | June 7, 1938 |
| 2,205,558 | Flett | June 25, 1940 |
| 2,304,830 | Katzman | Dec. 15, 1942 |
| 2,389,427 | Gertler | Nov. 20, 1945 |
| 2,424,220 | Bousquet | July 22, 1947 |

OTHER REFERENCES

Vanags:—Chemical Abstracts, vol. 34 (1940) pages 1982–1983. (Copy in P. O. S. L.)

McAllister:—J. Economic Entomology, Dec. 1930, vol 23, pages 907–913, 916. (Copy in Div. 43.)

Soap and Sanitary Chemicals (Jan. 1943, pages 95 and 96 by Roarck). (Copy in Patent Office.)